(12) United States Patent
Butikofer (10) Patent No.: US 8,310,449 B1
(45) Date of Patent: Nov. 13, 2012

(54) TOUCH INTERFACE DEVICE, SYSTEM, AND METHOD

(75) Inventor: Christian R. Butikofer, St. Paul, MN (US)

(73) Assignee: Lockheed Martin Corporation, Bethesda, MD (US)

(*) Notice: Subject to any disclaimer, the term of this patent is extended or adjusted under 35 U.S.C. 154(b) by 642 days.

(21) Appl. No.: 12/342,390

(22) Filed: Dec. 23, 2008

(51) Int. Cl.
*G09G 5/00* (2006.01)

(52) U.S. Cl. ....................................................... 345/168

(58) Field of Classification Search .................... 369/168
See application file for complete search history.

(56) References Cited

U.S. PATENT DOCUMENTS

| | | | | |
|---|---|---|---|---|
| 5,278,557 A * | 1/1994 | Stokes et al. | | 341/34 |
| 2002/0180708 A1* | 12/2002 | Kaelbling | | 345/169 |
| 2006/0261983 A1* | 11/2006 | Griffin et al. | | 341/27 |
| 2008/0211696 A1* | 9/2008 | Griffin et al. | | 341/22 |
| 2009/0164062 A1* | 6/2009 | Aoki et al. | | 701/36 |

FOREIGN PATENT DOCUMENTS

| | | | | |
|---|---|---|---|---|
| EP | 59378 A1 | * | 9/1982 | |
| EP | 101211 A1 | * | 2/1984 | |
| JP | 05077679 A | * | 3/1993 | |
| JP | 07039647 A | * | 2/1995 | |
| JP | 2004355606 A | * | 12/2004 | |

* cited by examiner

*Primary Examiner* — Latanya Bibbins
(74) *Attorney, Agent, or Firm* — Hamre, Schumann, Mueller & Larson, P.C.

(57) ABSTRACT

A touch interface that includes a plurality of push-buttons, each of which has a first stage portion and a second stage portion. A display screen displays a plurality of display items each of which is associated with a corresponding one of the push-buttons. Activation of the first stage portion of one of the push-buttons causes the corresponding display item on the screen to highlight thereby indicating to the user that the push-button associated with that display item is being pressed, without launching a function associated with the display item. This allows the user to determine whether or not he is pressing the correct push-button prior to activating a function without taking his eyes off of the display screen. If the user is satisfied that he is contacting the correct push-button, the user can then activate the second stage portion and thereby launch the function.

12 Claims, 7 Drawing Sheets

TOUCH INTERFACE DEVICE, SYSTEM, AND METHOD

FIELD

The device, system, and method relates generally to a touch interface in communication with a display device.

BACKGROUND

Systems that include a keyboard and a display device are known. A traditional keyboard generally provides at least one kind of tactile feedback when the keys are pressed. A key is an example of a push activated button, which allows the user to feel when the key is pushed. This feel is a form of a tactile feedback. This example of tactile feedback allows the user to develop the ability for touch-typing. Touch-typing allows the user to keep her eyes on the display device while using the keyboard for input. Generally, touch-typing provides faster input because the user does not have take her eyes off of the display device to look at the keyboard when interacting with a system that has the traditional keyboard and display device.

The traditional keyboard has a plurality of keys, wherein each key is identified and fixed to a particular input. For example, the "A" key is labeled "A" and provides input for the alphanumeric character "A." Further, traditional keyboards do not provide any visual feedback on the display screen that the user is touching a particular key on the keyboard. This requires the user to learn to touch-type and make an assumption that a particular key is being selected. The only visual feedback the user receives is after the key has been pushed all the way to activate the input associated with the key. For a user who has not learned to touch-type, the user must look down at the keyboard, move the finger away from the keys, visually search for and identify the desired key from the plurality of keys, and then push the desired key to activate the key input, then look at the screen of the display device and confirm that the desired key has been pressed.

Keyboards have been developed to provide alterable key assignments. For example, a keyboard that uses Liquid Crystal Display (LCD) on or below each key to indicate to the user the key assignment is known. LCD may be provided on the top surface of the key. LCD may be provided below the key and the key made of a clear material such that the LCD is visible by the user. In such devices, a key first labeled "A" that first provides input for the alphanumeric character "A" may be changed to a second label "B" and changed to provide input for the alphanumeric character "B," dynamically or statically. Dynamically means while the user is using the device. Statically means the user must first stop using the device for input to change the display on the LCDs prior to using the new labels and associated input function of the key(s). Although such modifiable keyboard may be capable of providing a dynamically changeable input device to changing needs of the user or software, such changes can lead to challenges to the user such that touch-typing becomes challenging if not impossible. For example, the user's fingers would overlap the small LCD screens of the keys obscuring the new key labels. Accordingly, if the key that was labeled "A" has changed to the label "B," the user would have to take the fingers off from the key and must look at the keyboard to recognize that this change in the label has occurred. There would be other challenges for the user to touch-type using a keyboard that uses LCDs on or below the keys.

Other systems provide a touch pad with a display matrix, wherein the display matrix is displayed on the screen of the display device. The display matrix simulates a selection of items that may be selected and/or activated by the user interacting with the touch pad. The display matrix displays matrix items that are associated with portions of the touchpad, such that when that portion of the touchpad is touched, the selected display matrix item is determined to be activated and/or selected. Because there is a separation of the touchpad and the matrix display on the screen, frequently the user takes her eyes off of the screen to look at the touchpad to make a selection and then move her eyes back to the screen. If an error is found to have been made in the selection, the user must again take her eyes off from the screen and look back at the touchpad to select and touch the desired area or portion of the touchpad that is associated with the display matrix item. Generally, a touchpad does not provide any tactile feedback, beyond the feel of a substantially hard and smooth surface.

Touch screens wherein the display device also acts as a touch activated input are known. Systems that include a touch screen generally include a layer provided on top of a display device, wherein the display device displays such as a matrix of keys on the screen of the display device. The user touches the screen to activate the displayed key. Touch screens can provide different displays of matrix of keys such that the same location on the screen may be used to activate differently identified keys. For example, at one time, on one display, a portion of the screen may indicate the "A" key and at a later time, the same portion of the screen may indicate the "B" key. When the user is using the matrix of keys for input, touch screens require a display of the matrix of keys to be on the screen. This requirement can take up a portion of the screen area, such that a significant portion of the screen of the display device is obstructed by the displayed matrix of keys. Often, touch screen interface requires a dedicated amount of display space on the screen. Screens are generally a flat and hard surface. Because the user is interacting with a generally flat surface of the screen, the user does not experience a tactile feed back when using touch screens. The lack of tactile feedback makes touch-typing difficult. The lack of tactile feedback can lead to more errors in the input from the user. The lack of tactile feedback generally forces the user to take her eyes off of the output portion of the screen to look at the input portion or the matrix of keys, which can lead to slower input and more frequent correction of errors.

All of the above devices, systems, and methods can lead to problems in a stressful operations environment when errors are not generally acceptable. Accordingly, devices, systems and methods for an improved touch interface that can provide one or more advantages of a push button interface for touch-typing and also provide one or more advantages of displays of a matrix of keys touch screens and/or touch pads are desirable.

SUMMARY

Embodiments disclosed herein relate to a device, system, and a method for a touch interface. An indication is provided to a user to enable the user to determine whether or not he is about to press a correct button prior to activating a function associated with the button, without requiring the user to take his eyes off of a display screen. If the user is satisfied that he is about to press the correct button, the user can then activate the button and thereby launch the function associated with the button.

In one embodiment, a touch interface device includes a plurality of push-buttons, each push-button having a first stage portion with a contact surface configured to be touched by a finger, and a second stage portion having a top surface. The first stage portion is provided on at least a portion of the top surface of the second stage portion and is moveable relative to the second stage portion. A signal output component is provided that communicates a signal when the first stage portion of one of the first stage portions is activated and communicates a signal when the second stage portion is activated. The first stage portion may be configured to be activated when the first stage portion is pushed with a low force. In addition, the contact surface may include a concave portion.

In another embodiment, a touch interface system includes a push-button device that has a plurality of push-buttons, each push-button having a first stage portion and a second stage portion. A display screen is connected to the push-button device. The display screen displays a plurality of display items, where each display item is associated with a corresponding one of the push-buttons of the push-button device. The push-button device further includes a signal output component that is configured to communicate a first signal when the first stage portion of one of the push-buttons is activated by a user that results in a modification of the corresponding display item on the display screen to indicate to the user that the user is contacting the push-button corresponding to the modified display item, and is configured to communicate a second signal when the second stage portion of the one push-button is activated by the user. The buttons of the push-button device can be arranged in a matrix.

A method includes coupling the push-button device to the display screen, and displaying the plurality of display items on the display screen, where each display item is associated with a corresponding one of the push-buttons of the push-button device. When the first stage portion of one of the push-buttons is activated by a user, a first signal is sent that results in a modification of the corresponding display item on the display screen to indicate to the user that the user is contacting the push-button corresponding to the modified display item. In addition, when the second stage portion of the one push-button is activated by the user, a second signal is sent that can, for example, launch a function that is associated with the corresponding display item.

DETAILED DESCRIPTION

The term "modification" is defined herein to include "transformation" are used interchangeably herein. The term "screen" is defined herein to include a display area or a portion of a display area visible to a user. Examples of devices that have a screen are monitors and projectors. The term "key" is defined herein to include a physical button that activates an input. Accordingly, in such a system, the key is in communication with other devices. Activating an input outputs a signal from the key to another device in the system. The term "input signal" is not defined or limited to a direction of a signal flow. The term "input signal" means a signal that communicates that the user has provided an input. Thus, an "input signal" may be sent via an output of a device or a system to another device or a system. Being in communication means that the key's output is sent to another device, directly, indirectly, via wire, via wireless, or in combinations thereof. Thus, a key is considered to be in communication with a display device if pressing the key causes a change in the display of the display device. An example of an indirect communication includes a computer being an intermediate device that is between the key and the display device. Accordingly, the key's output may communicate with the computer using standard interface technologies such as Universal Serial Bus (USB), PS/2, RS-232 or other common and established computer interfaces for an input device. The computer in turn may communicate with the display device via RGB, Panel Link, HDMI, VGA, S-Video, or other common and established interfaces between a computer and a display device. The display device may be, for example and not limited to, CRT, LCD, Plasma, OLED, Projector, or other devices. The indirect communication using the computer as the intermediate device may be performed by a software or a hardware having instructions that provides sensing of the key to affect the display on the display device. The term "push-button" is defined herein to include a key. Accordingly, the term "key" is used herein interchangeably with push-button. A push- button is generally activated by pressing down or pushing. Generally, a standard button force may be required to activate the push-button. The standard button force is approximately 0.6 Newton (N). The force may be more or less than 0.6 N. A push-button may be configured to be activated by a movement of the push-button. One example of a movement is approximately 4 mm travel distance. The travel distance may be more or less than 4 mm. The term "touch activated" is defined herein to include generating an output by sufficient physical contact. Sufficient physical contact means there is a measurable physical contact between the user and the key by detecting an electrical potential, a magnetic field, an optical variation, a low force, or any combinations thereof. A "low force" is defined to include approximately 0.15 N. A "low force" is defined to include wherein the force is sufficient to move a key by a travel distance of approximately 1 mm. A touch-type capable surface on a key includes structural features on the surface that allow a user to determine by touch that a finger is substantially touching a particular key. Examples of structural features include, but are not limited to, a concave portion, a convex portion, and other structural features that can be felt by the finger to facilitate touch-typing for user.

Figure 1:
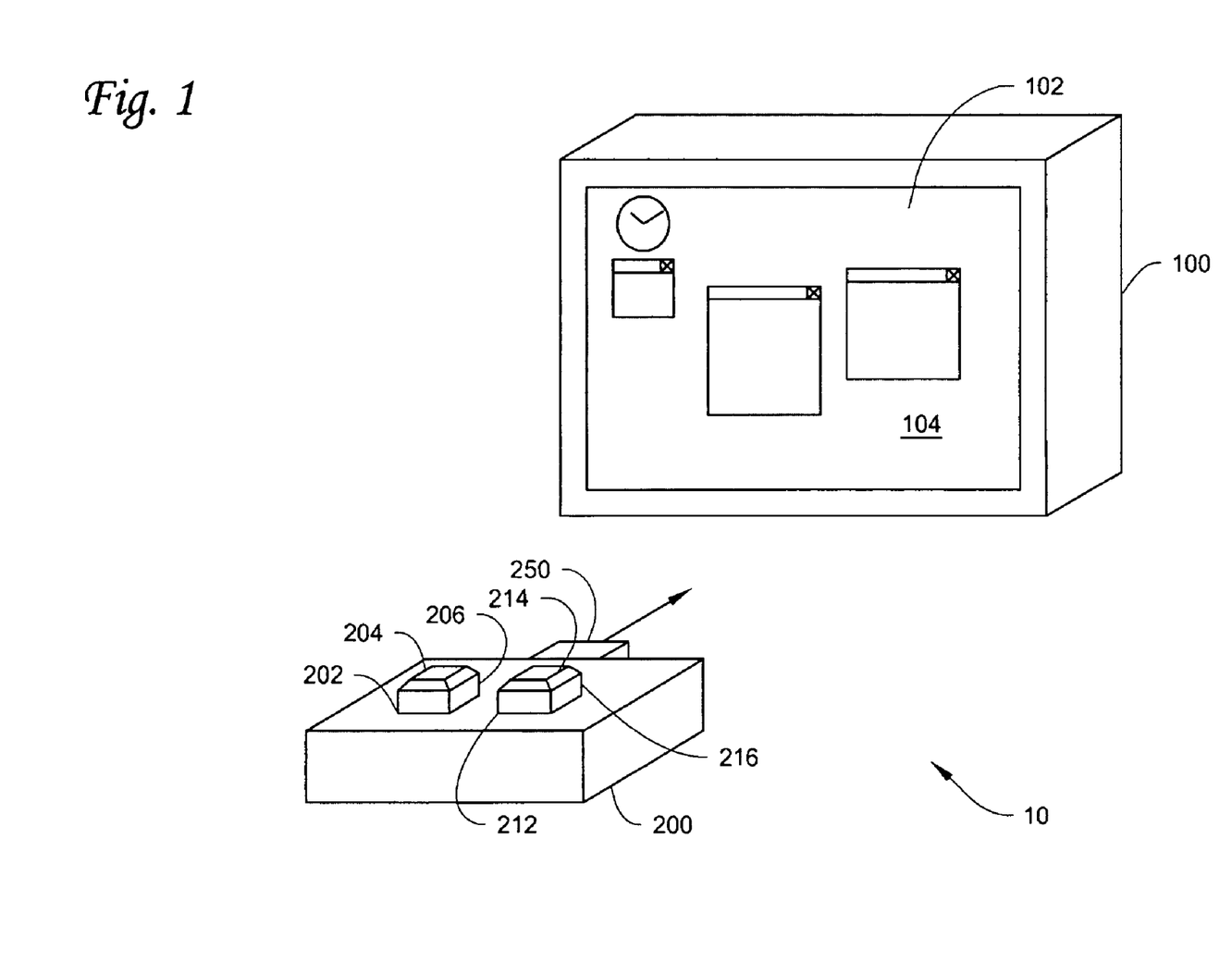
FIG. 1 illustrates a system according to an embodiment.

FIG. 1 shows an example of a system according to an embodiment prior to touch or contact by the user. The touch interface system 10 includes a display device 100. The display device 100 includes a screen 102. The screen 102 is capable of displaying multiple displays. FIG. 1 is showing an example wherein a first display 104 is being displayed on the screen 102.

The touch interface system 10 also includes a touch interface device 200 that is in communication with the display device 100. The communication may be direct or indirect. The communication may be unidirectional or bidirectional.

The touch interface device 200 includes one or more keys. In the embodiment shown in FIG. 1, the touch interface device 200 is illustrated to have two keys, a first key 202 and a second key 212. The first key 202 is shown with a first stage portion 204 and a second stage portion 206. The second key 212 is shown with a first stage portion 214 and a second stage portion 216. The touch interface device 200 also includes a signal output component 250 that communicates with other devices, such as the display device 100. It is envisioned that other embodiments of the touch interface device has more than two keys. It is envisioned that other embodiments of the touch interface device has an N×M matrix of keys, wherein N and M may be the same or different integers. It is envisioned that other embodiments of the touch interface device may include multiple matrix of keys. It is envisioned that other embodiments of the touch interface device may include ergonomic distribution of keys according to the right hand or the left hand or both hands. It is envisioned that the touch interface device may include other ergonomic features. The 1×2 matrix example of the touch interface device 200 illustrated in FIG. 1 is only an example and other configurations and layouts of the device would be obvious to one skilled in the art. For example, the device is not required to have a square or rectangular matrix configuration of keys. The keys of other embodiments may be in a circular configuration or layout.

Figure 2:
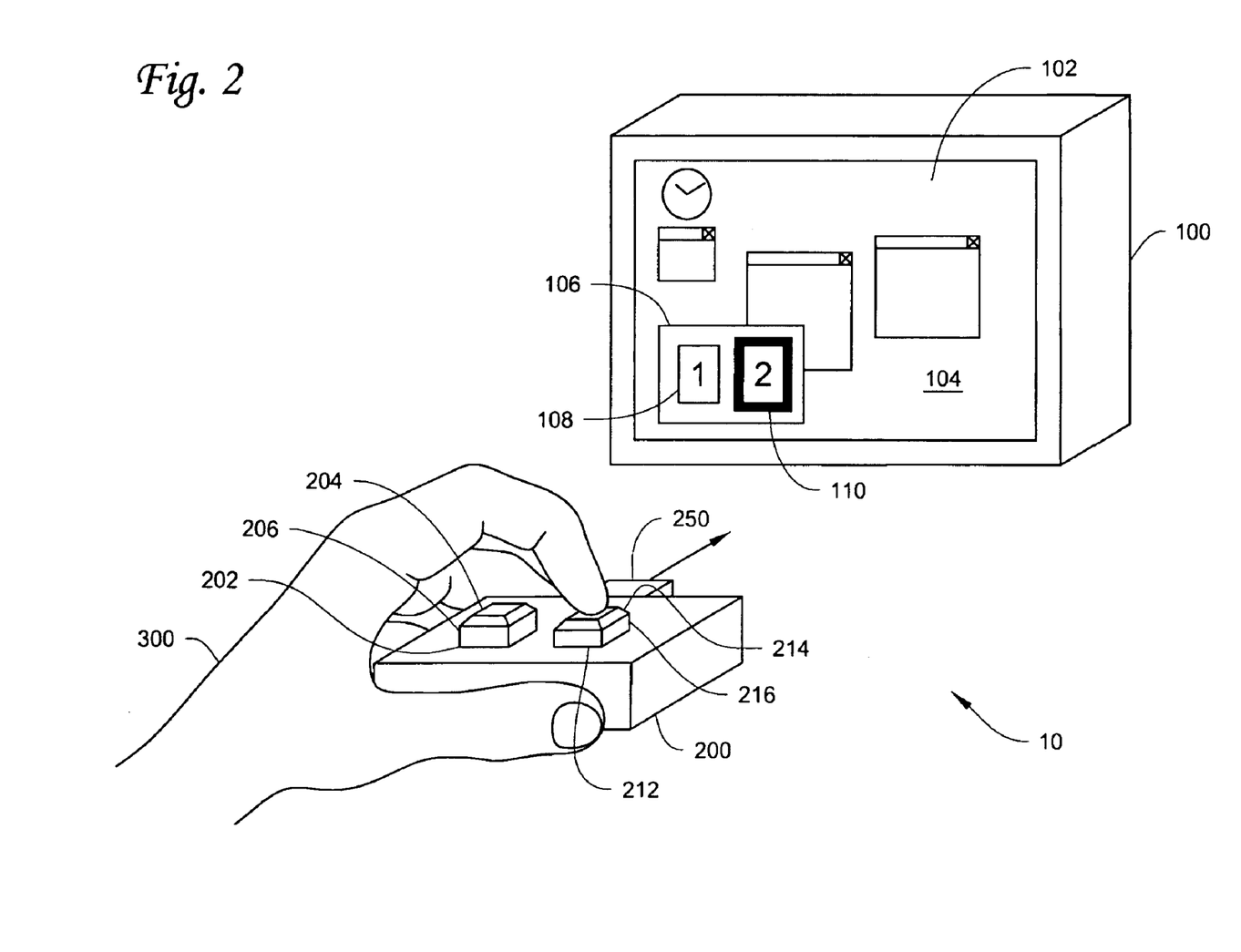
FIG. 2 illustrates the system when a first stage of a key is activated according to an embodiment.

FIG. 2 shows an example of the embodiment shown in FIG. 1 when the first stage of a key is activated. FIG. 2 shows when the user's 300 finger touches the first stage portion 214 with sufficient physical contact to activate the touch interface device 200, and in particular the first stage portion 214 of the second key 212. Activation of the first stage causes a signal output component 250 to communicate this input of first stage activation of the second key 212 with an output of the first stage activation signal to the display device 100. FIG. 2 shows that this activation causes the display matrix 106 to be displayed on the display screen 102 overlaid on top of the first display 104 such that the display matrix 106 is substantially visible to the user. For example, the display matrix 106 being displayed may be implemented by instructions in OpenGL. OpenGL may provide the capability to produce a layered display of the display matrix 106. For example, the display matrix 106 may be displayed in a layer above other program windows displayed on the display screen 102. For example, the display matrix 106 may be displayed with semi-transparency so that the operator could still see and react to display events that may occur in windows displayed behind the display matrix 106 on the display screen 102. For example, the semi-transparency may be implemented by an alpha-blending technique in graphics programming. Other implementations are also possible. The display matrix 106 is displayed on the display screen 102 as long as the first stage activation signal is active. For example, the first stage activation signal is active as long as the first stage portion is being contacted with sufficient physical contact by the user 300. Upon there being no more sufficient physical contact between the user 300 and the first stage portion 214, the display matrix 106 would depart the screen. Alternatively, upon there being no more sufficient physical contact between the user 300 and the first stage portion 214, the display matrix 106 would depart the screen after a defined period of time. The defined period of time may be a predetermined period of time. The defined period of time may be user defined. For example, a user may define the period of time to be 3 seconds, whereupon when the user 300 makes sufficient physical contact with the first stage portion 214, the display matrix 106 would be displayed on the display screen 102. Upon the user 300 removing the finger from the first stage portion 214 so that there is no more a sufficient physical contact between the user 300 and the first stage portion 214, the display matrix 106 would continue to be displayed on the display screen 102 for 3 seconds and then stop being displayed on the display screen 102. The display matrix 106 includes sufficient number of matrix items that are each associated with each key of the touch interface device 200. In FIG. 2, the display matrix 106 includes a matrix item 108 associated with the first stage of the first key 202 being displayed in such a way to indicate that it has not been selected, and a matrix item 110 associated with the first stage of the second key 212, that is illustrated in FIG. 2 to indicate that the user's finger has activated the first stage of the second key 212. Accordingly, in the example illustrated in FIG. 2, the indicator includes a visual indicator of which key's first stage has been activated. An audial indicator may also be included along with or without the visual indicator. For example, a tone of a particular frequency, amplitude, or other qualities may be an indicator that a first stage of a particular key has been activated. In the example shown in FIG. 2, the user 300 is aware that the user's 300 finger is in contact with the touch interface device 200 because the display matrix 106 is being displayed. Further, the user is aware that the user's finger 300 has provided sufficient physical contact with the second key 212 because the matrix item 110 associated with the first stage of the second key 212 is being displayed with an indicator, for example highlighted, to indicate that contact. The user is also aware that the user's finger 300 is not in sufficient physical contact with the first key 202 because the matrix item 108 associated with the first key 202 is displayed without an indicator, for example in non-highlighted form, to indicate that it has not been selected. The user is aware of all of these things without having to look down at the touch interface device 200. Although FIG. 2 shows that the visual display matrix 106 is a matrix layout that is similar to the touch interface device 200, it is not required to be so. For example, items associated with various keys of the touch interface device 200 may be displayed anywhere on the screen 102.

Figure 3:
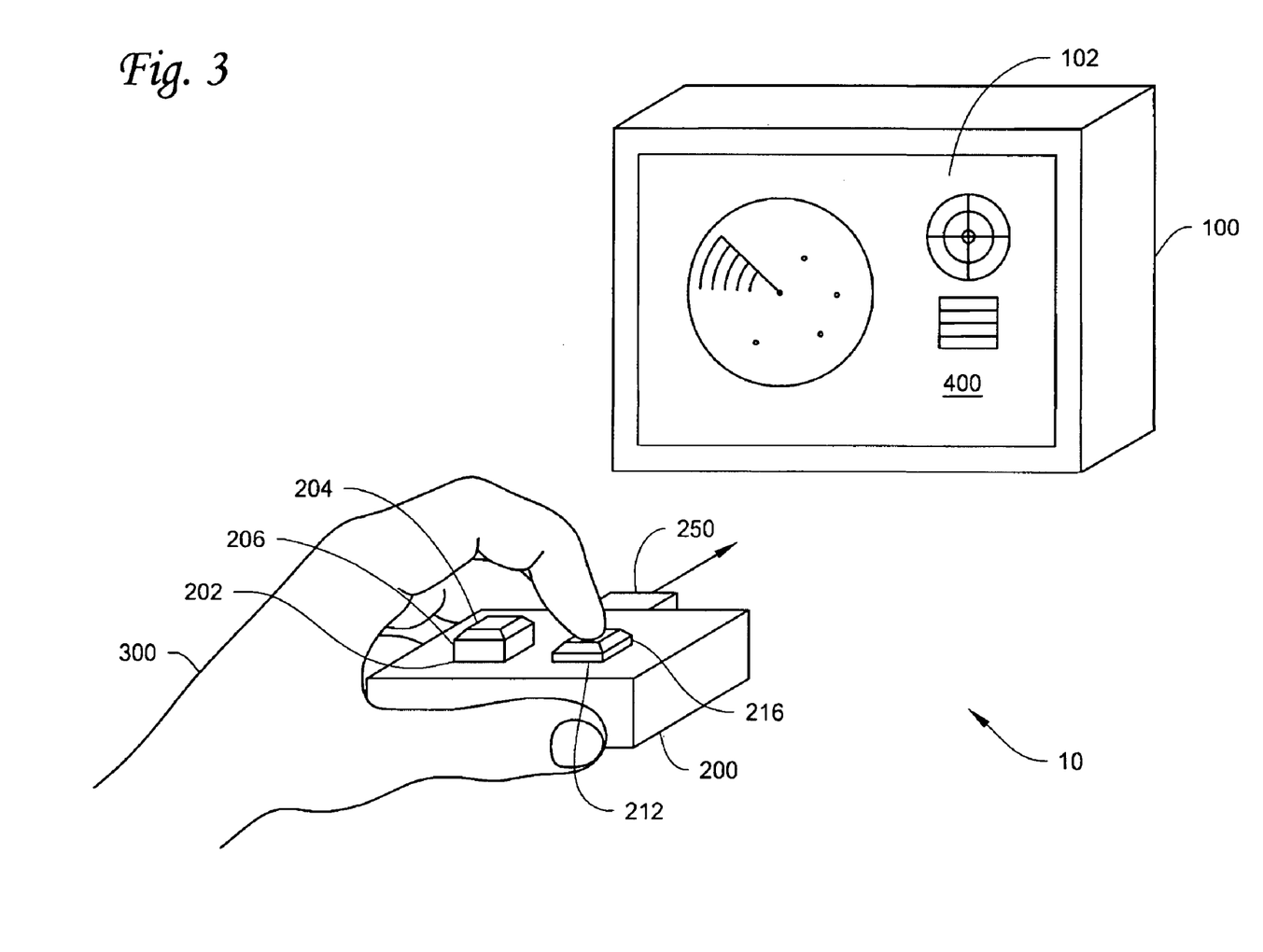
FIG. 3 illustrates the system when a second stage of the key is activated according to an embodiment.

FIG. 3 shows an example wherein the second stage of the second key 212 is activated according to the embodiments shown in FIGS. 1 and 2. The user has provided enough force to push the second key 212 to activate the second stage portion 216 of the second key. This activation communicates an output for second stage activation from the second key 212 to the display device 100. In this example, such an activation causes the first display 104 to be replaced by a second display 400 on the screen 102. Other actions and results are possible, including a redisplay of secondary matrix display for further selection of matrix items by the user (not illustrated).

Figure 4:
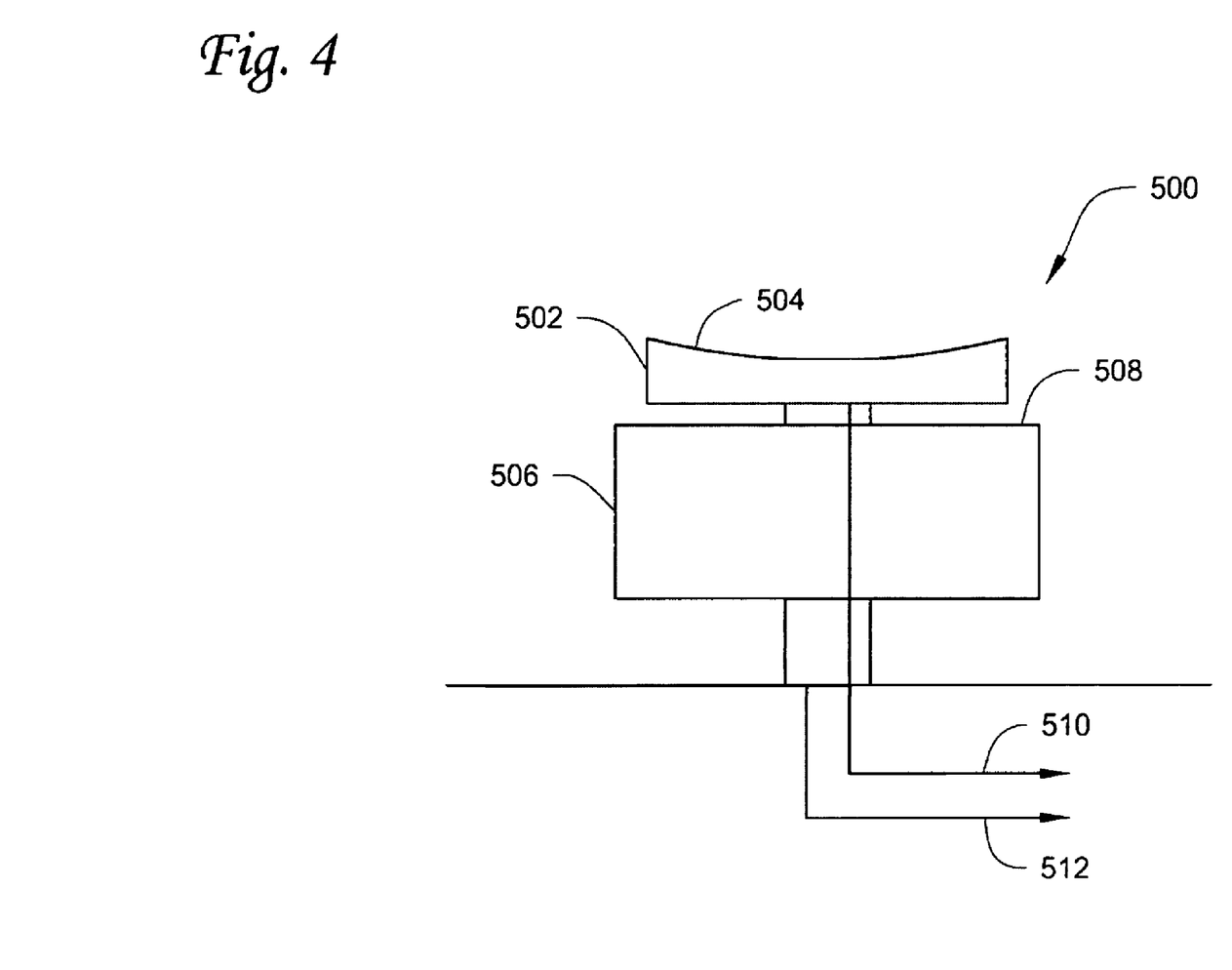
FIG. 4 is a side view of a push-button according to an embodiment.

FIG. 4 shows the side view of a push-button 500 that can be used for the keys 202, 212. The push-button 500 includes a first stage portion 502. The first stage portion 502 includes a contact surface 504. The contact surface 504 of the embodiment shown in FIG. 4 is concave. The push-button 500 also includes a second stage portion 506. The second stage portion 506 includes a top surface 508. The first stage portion 502 is provided on top of the top surface 508. The first stage portion 502 may be provided on at least a portion of the top surface 508. Activation of the first stage portion 502 causes an output for the first stage activation 510 to be communicated to another device. The second stage portion 506 is push activated. Activation of the second stage portion 506 causes an output for the second stage activation 512 to be communicated to another device. Another device may include a computer, processor, and/or display device.

Figure 5:
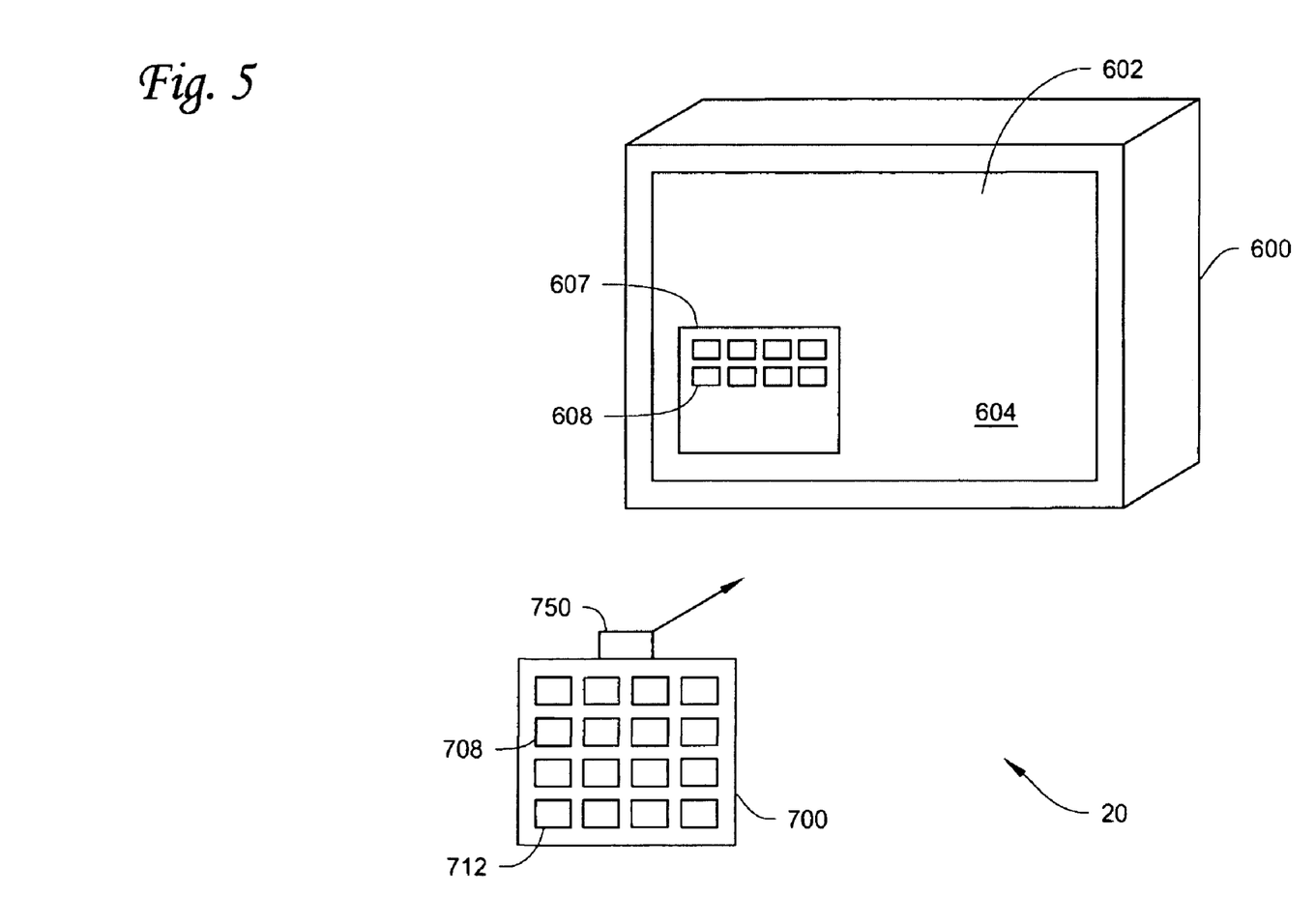
FIG. 5 illustrates another embodiment of a touch interface system.
Figure 6:
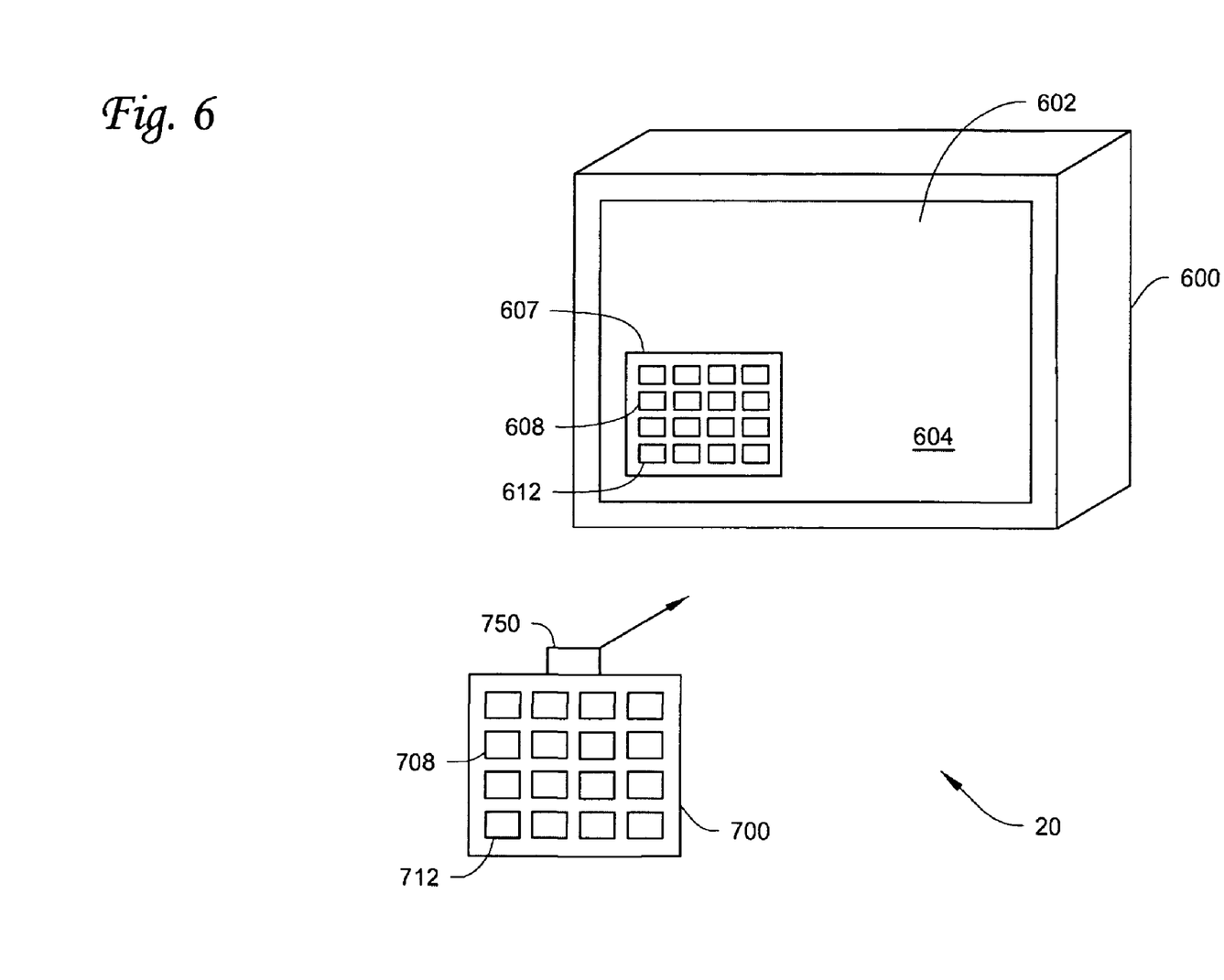
FIG. 6 illustrates the embodiment of FIG. 5 used in a different manner.

FIGS. 5 and 6 show another example of a touch interface system. The touch interface system 20 includes a display device 600 that includes a screen 602. The screen 602 is capable of displaying multiple displays. FIG. 5 shows one example of a display 604 displayed on the screen 602.

The touch interface system 20 includes a touch interface device 700 that is in communication with the display device 600. The communication may be direct or indirect. The communication may be unidirectional or bidirectional. The example is shown with a touch interface device 700 that includes a plurality of push-buttons. The plurality of push-buttons are arranged in a N×M matrix, wherein N=M=4 in the example shown. Other layouts of push-buttons are possible. The push-buttons are two-stage push-buttons as described with respect to FIGS. 1-4, where each push-button includes a touch activated surface that produces a first stage activation signal and a push activated key that produces a second stage activation signal. In the embodiment shown in FIGS. 5 and 6, the touch interface device 700 is illustrated to have sixteen push-buttons, but a greater or less number of push-buttons are possible and envisioned. One of the push-buttons 708, and another push-button 712 are discussed below.

FIG. 5 shows an example of a display matrix 607 that is displayed on the screen 602, for example when the user's finger touches one of the push-buttons. In the example shown in FIG. 5, the display matrix 607 has display items 608 that are each associated with a corresponding one of the push-buttons of the touch interface device 700. It is not required that every push-button of the touch interface device 700 be active and associated with a display item 608 of the display matrix 607. For example, the push-button 708 is shown to be associated with the display item 608 of the display matrix 607. In FIG. 5, the push-button 712 is not associated with any of the display items of the display matrix 607. Therefore, in FIG. 5, only the upper two rows of push-buttons are active and have associated display items 608, while the lower two rows of push-buttons are inactive.

FIG. 6 shows another example where push button 712 is associated with a display item 612 of the display matrix 607, and all of the push buttons are active and have an associated display item in the display matrix 607.

Accordingly, what is displayed on the display matrix 607 may or may not directly match the layout of the touch interface device 700 or the layout of the push-buttons. Alternatively, the display matrix 607 may have display items that are more in number than the number of buttons on the touch interface device 700, allowing for scrolling of the display matrix vertically and/or horizontally on the screen 602.

The operation of the system 20 in FIGS. 5 and 6 is similar to the operation discussed above for the system 10. When the user touches the first stage portion of one of the push-buttons that is active, the corresponding display item on the display screen highlights or otherwise indicates to the user that he is touching that button and about to push the button to activate the function associated with the corresponding display item. If the user is pressing the wrong button, he can correct himself before pressing the incorrect button. If the user determines that he is pressing the correct button, he can continue pressing the button to activate the second stage portion and launch the function associated with the corresponding display item.

Figure 7:
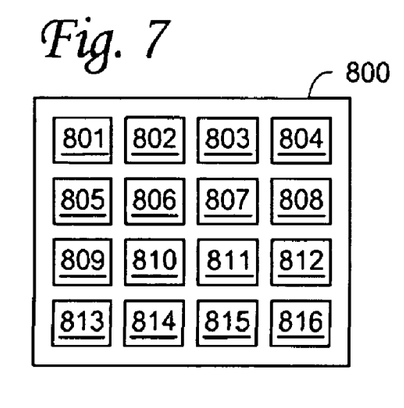
FIG. 7 illustrates a top view of a device according to an embodiment.

FIG. 7 shows another example touch interface device 800 having a 4×4 matrix of keys 801, 802, 803, 804, 805, 806, 807, 808, 809, 810, 811, 812, 813, 814, 815, 816. One or more of the keys 801, 802, 803, 804, 805, 806, 807, 808, 809, 810, 811, 812, 813, 814, 815, 816 may be or similar to the push-button 500 shown in FIG. 4. FIGS. 8A, 8B, 8C, and 8D show display matrixes 900, 920, 940, 960 that are displayed on a display screen, wherein only one of the display matrixes 900, 920, 940, 960 is displayed when and in accordance with the user's interaction with the touch interface device 800 of FIG. 7, when a key is activated such that the one of the display matrixes 900, 920, 940, 960 is displayed on the display screen overlaid on top of the display such that one of the display matrixes 900, 920, 940, 960 is substantially visible to the user.

Figure 8A:
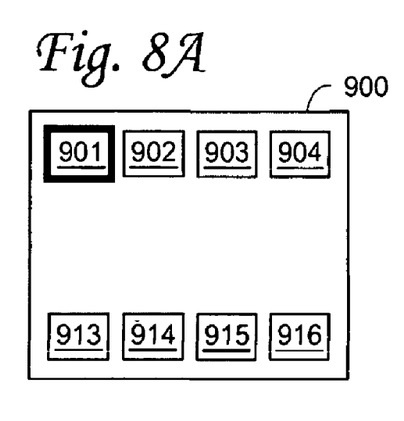
FIG. 8A illustrates a display matrix according to an embodiment.

For example, when the user activates key 801 on the touch interface device 800 the display matrix 900 shown in FIG. 8A is displayed on the display screen. The display matrix 900 shows a certain number of display items 901, 902, 903, 904, 913, 914, 915, 916 that are each associated with the keys 801, 802, 803, 804, 813, 814, 815, 816 of the touch interface device 800. The display matrix 900 does not show display items associated with some of the keys 805, 806, 807, 808, 809, 810, 811, 812 of the touch interface device 800. Accordingly, pressing the key 805 would not cause further transformation of the display matrix 900 because a display item associated with key 805 is not displayed in the display matrix 900. In contrast, when the first stage portion of the key 801 is activated by the user, a first signal is sent to the display such that a transformation of the corresponding display item 901 is modified to indicate visibly on the screen so that the user can observe that the user is contacting the key 801 corresponding to the display item 901.

Figure 8B:
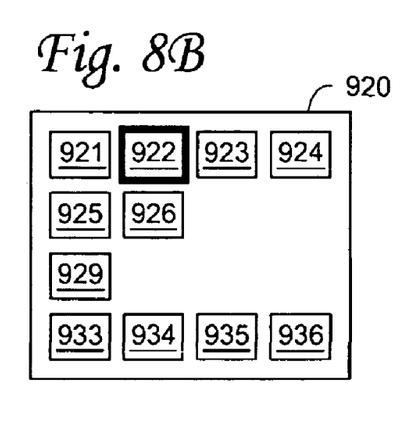
FIG. 8B illustrates a display matrix according to an embodiment.

When the user activates key 802 on the touch interface device 800 the display matrix 920 shown in FIG. 8B is displayed on the display screen. When the first stage portion of the key 802 is activated by the user, a first signal is sent to the display such that a modification of the corresponding display item 922 is transformed to indicate visibly on the screen so that the user can observe that the user is contacting the key 802 corresponding to the display item 922. Further, when the key 802 is activated, additional display items 925, 926, 929 are displayed on the display matrix 920. The additional display items 925, 926, 929 are each respectively and positionally associated with corresponding keys 805, 806, 809 on the touch interface device 800.

Figure 8C:
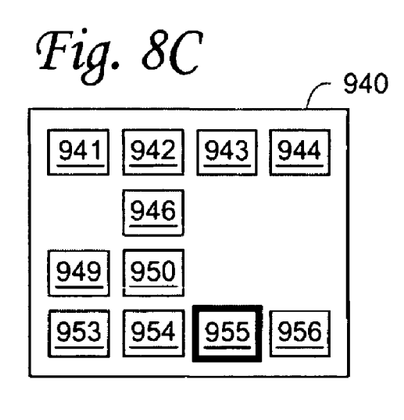
FIG. 8C illustrates a display matrix according to an embodiment.
Figure 8D:
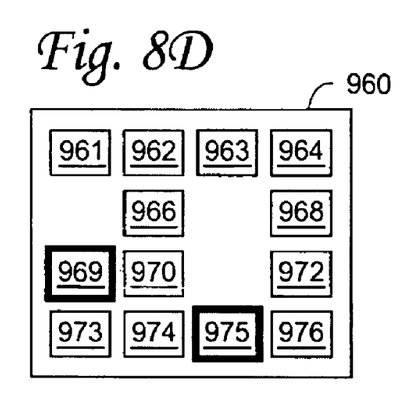
FIG. 8D illustrates a display matrix according to an embodiment.

For example, when the user activates key 815 on the touch interface device 800 the display matrix 940 shown in FIG. 8C is displayed on the display screen. When the first stage portion of the key 815 is activated by the user, a first signal is sent to the display such that a modification of the corresponding display item 955 is transformed to indicate visibly on the screen so that the user can observe that the user is contacting the key 815 corresponding to the display item 955. Further, when the key 815 is activated, additional display items 946, 949, 950 are displayed on the display matrix 940. The additional display items 946, 949, 950 each respectively correspond to keys 806, 809, 810 on the touch interface device 800. When the first stage portion of the key 809 is activated by the user, the corresponding display item 969 is transformed to indicate visibly on the screen so that the user can observe that the user is contacting the key 809. When the key 809 is activated, the display matrix is transformed to the display matrix 960 shown in FIG. 8D. The display matrix 960 shows additional display items 968, 972 to be displayed. The display items 968, 972 are each respectively associated with corresponding keys 808, 812 of the touch interface device 800.

Preferred embodiments have been described. Those skilled in the art will appreciate that various modifications and substitutions are possible, without departing from the scope of the invention as claimed and disclosed, including the full scope of equivalents thereof.

What is claimed is:

1. A method for a touch interface system that includes a computer, a computer monitor having a display screen, a push-button device, and a signal output component, wherein the computer monitor is connected to the computer, wherein the signal output component is connected to the push-button device, and wherein the push-button device includes a plurality of push-buttons, each push-button having a first stage portion and a second stage portion, the method comprising:

coupling the push-button device to the display screen of the computer monitor by sending a signal from the push-button device via the signal output component to the computer and communicating the signal from the computer to the computer monitor;

displaying a display matrix as a display layer on the display screen of the computer monitor, the display matrix displaying a plurality of display items, each display item being associated with a corresponding one of the push-buttons of the push-button device; and displaying a second display layer that is different from the display matrix on the display screen of the computer monitor;

when the first stage portion of one of the push-buttons is activated by a user, sending a first signal that results in a modification of the corresponding display item on the display matrix to indicate to the user that the user is contacting the push-button corresponding to the modified display item; and when the second stage portion of the one push-button is activated by the user, sending a second signal that results in a modification of the second display layer on the display screen of the computer monitor, wherein the display matrix is displayed as a single display layer on the display screen of the computer monitor, wherein the display matrix and the second display layer are displayed at the same time on the display screen of the computer monitor, wherein the display matrix is displayed on top of the second display layer, and wherein the modification of the corresponding display item comprises highlighting the corresponding display item within the display matrix.

2. The method for a touch interface according to claim 1, wherein the second signal causes a function associated with the corresponding display item on the display matrix to launch.

3. The method of claim 1, wherein the arrangement of the display items displayed on the display matrix does not correspond to the arrangement of the push buttons on the push-button device.

4. The method of claim 1, wherein the number of the display items displayed on the display matrix is more or less than the number of push buttons on the push-button device, and wherein the user can scroll the display matrix to display other display items.

5. The method of claim 1, wherein the modification of the second display layer includes removal of the second display layer from the display screen and displaying of another display layer that is different from the second display layer and the display matrix.

6. A touch interface system, comprising:
a computer,
a computer monitor having a display screen, the computer monitor being connected with the computer,
a push-button device that includes a plurality of push-buttons, each push-button having a first stage portion and a second stage portion; and
a signal output component that is connected to the push-button device, wherein the push-button device, the signal output component, the computer and the computer monitor having the display screen are configured to:
(1) couple the push-button device to the display screen of the computer monitor by sending a signal from the push-button device via the signal output component to the computer and communicating the signal from the computer to the computer monitor;
(2) display a display matrix as a display layer on the display screen of the computer monitor, the display matrix displaying a plurality of display items, each display item being associated with a corresponding one of the push-buttons of the push-button device; and
(3) display a second display layer on the display screen of the computer monitor, wherein when the first stage portion of one of the push-buttons is activated by a user, a first signal is sent, thereby resulting in a modification of the corresponding display item on the display matrix to indicate to the user that the user is contacting the push-button corresponding to the modified display item, and when the second stage portion of the one push-button is activated by the user, a second signal is sent, thereby resulting in a modification of the second display layer on the display screen of the computer monitor, wherein the display matrix is displayed as a single display layer on the display screen of the computer monitor, wherein the display matrix and the second display layer are displayed at the same time on the display screen of the computer monitor, wherein the display matrix is displayed on top of the second display layer, and wherein the modification of the corresponding display item comprises highlighting the corresponding display item within the display matrix.

7. The touch interface system according to claim 6, wherein the second signal causes a function associated with the corresponding display item on the display matrix to launch.

8. The touch interface system according to claim 6, wherein the plurality of push-buttons are arranged in an N×M matrix, wherein N and M are integers, N indicating the number of rows and M indicating the number of columns in the matrix.

9. The touch interface system according to claim 6, wherein the second stage portion has a top surface, and the first stage portion is provided on at least a portion of the top surface of the second stage portion and is moveable relative to the second stage portion.

10. The system of claim 6, wherein the arrangement of the display items displayed on the display matrix does not correspond to the arrangement of the push buttons on the push-button device.

11. The system of claim 6, wherein the number of the display items displayed on the display matrix is more or less than the number of push buttons on the push-button device, and wherein the user can scroll the display matrix to display other display items.

12. The system of claim 6, wherein the modification of the second display layer includes removal of the second display layer from the display screen and displaying of another display layer that is different from the second display layer and the display matrix.

* * * * *